(12) United States Patent
Higuchi et al.

(10) Patent No.: US 11,811,216 B2
(45) Date of Patent: Nov. 7, 2023

(54) ELECTRONIC APPARATUS AND CONTROL METHOD

(71) Applicant: Nippon Telegraph and Telephone Corporation, Tokyo (JP)

(72) Inventors: Yuichi Higuchi, Tokyo (JP); Toshiki Wada, Tokyo (JP); Toshihiko Kondo, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 24 days.

(21) Appl. No.: 17/613,600

(22) PCT Filed: May 24, 2019

(86) PCT No.: PCT/JP2019/020659
§ 371 (c)(1),
(2) Date: Nov. 23, 2021

(87) PCT Pub. No.: WO2020/240615
PCT Pub. Date: Dec. 3, 2020

(65) Prior Publication Data
US 2022/0239092 A1     Jul. 28, 2022

(51) Int. Cl.
*G06F 3/01* (2006.01)
*H02H 5/04* (2006.01)
*G08B 7/06* (2006.01)
*G08B 21/18* (2006.01)

(52) U.S. Cl.
CPC .............. *H02H 5/04* (2013.01); *G06F 3/016* (2013.01); *G08B 7/06* (2013.01); *G08B 21/182* (2013.01)

(58) Field of Classification Search
CPC .. H02H 5/04; G06F 3/016; G08B 7/06; G08B 21/182
See application file for complete search history.

(56) References Cited

U.S. PATENT DOCUMENTS

2018/0369865 A1    12/2018   Shoji et al.

FOREIGN PATENT DOCUMENTS

| CN | 101150278 | * | 7/2009 | |
| CN | 106054075 | * | 6/2016 | ........... G01R 31/343 |
| JP | 2004072496 | * | 8/2002 | ............. Y02D 30/70 |
| JP | 2016177455 | * | 3/2015 | |
| JP | 2016177455 | A | 10/2016 | |
| JP | 2017063916 | A | 4/2017 | |
| JP | 2018099025 | * | 12/2017 | |

(Continued)

OTHER PUBLICATIONS

Amemiya, Tomohiro et al., "Buru-Navi3 Gives You a Feeling of Being Pulled", NTT Technical Review, vol. 12 No. 11, Nov. 2014, 6 pages.

*Primary Examiner* — Hongmin Fan
(74) *Attorney, Agent, or Firm* — Slater Matsil, LLP (57) ABSTRACT

An electronic device includes: a housing; an actuator installed inside the housing and configured to generate vibration in response to an application of a driving voltage; a temperature sensor configured to detect an operating temperature caused by the actuator; and a control circuit configured to apply the driving voltage to the actuator to drive the actuator, thereby generating a traction illusion, where the control circuit restricts an operation of the actuator, based on the operating temperature detected by the temperature sensor.

15 Claims, 7 Drawing Sheets

(56) References Cited

FOREIGN PATENT DOCUMENTS

| | | | |
|---|---|---|---|
| JP | 2019165895 | * | 3/2018 |
| JP | 2018084920 | A | 5/2018 |
| WO | 2017115729 | A1 | 7/2017 |

* cited by examiner

ELECTRONIC APPARATUS AND CONTROL METHOD

CROSS-REFERENCE TO RELATED APPLICATION

This application is a national phase entry of PCT Application No. PCT/JP2019/020659, filed on May 24, 2019, which application is hereby incorporated herein by reference.

TECHNICAL FIELD

The present invention relates to a traction illusion generation technique applicable to an electronic device that causes an actuator to vibrate to generate a traction illusion.

BACKGROUND

Conventionally, so-called tactile devices have been proposed as pseudo tactile force generators causing actuators (vibrators) to generate asymmetric vibrations so that persons can perceive the pseudo tactile force (see, for example, Patent Literature 1 and Non-Patent Literature 1). This type of tactile device is a device that utilizes the human illusion, and can create a traction illusion as if a hand is being pulled in a specific direction, although it is not physically pulled.

CITATION LIST

Patent Literature

Patent Literature 1: Re-publication of PCT International Publication No. 2017-115729

Non-Patent Literature

Non-Patent Literature 1: Tomohiro Amemiya, Shinya Takamuku, Sho Ito, and Hiroaki Gomi, "Buru-Navi3 Gives You a Feeling of Being Pulled", NTT Technical Review, Vol. 12 No. 11 November 2014

SUMMARY

Technical Problem

Such tactile devices are being considered for installation in compact and portable electronic devices, such as smartphones, tablets, and portable game machines. However, when a tactile device is operated for a long time, the amount of heat generated by an actuator gradually increases and this is transferred to the skin of a user hand. Accordingly, if the heat generation temperature exceeds the human body temperature, there will be a possibility of causing a low temperature burn. In general, it is known that the low temperature burn may occur when the surface temperature reaches 45° C. or higher, which is considerably higher than the human body temperature, 36° C.

The present invention is for solving the above-mentioned problem, and intends to provide a traction illusion generation technique capable of suppressing heat generation of an actuator.

Means for Solving the Problem

In order to achieve the above-mentioned object, an electronic device embodiment of the present invention includes a housing, an actuator installed inside the housing and configured to generate vibration in response to an application of a driving voltage, a temperature sensor that detects an operating temperature caused by the actuator, and a control circuit configured to apply the driving voltage to the actuator to drive the actuator, thereby generating a traction illusion, wherein the control circuit restricts an operation of the actuator, based on the operating temperature detected by the temperature sensor.

Further, a control method embodiment of the present invention is a control method usable for an electronic device including a housing, an actuator installed inside the housing and configured to generate vibration in response to an application of a driving voltage, a temperature sensor that detects an operating temperature caused by the actuator, and a control circuit that controls the actuator. The method includes a step in which the control circuit applies the driving voltage to the actuator to drive the actuator, thereby generating a traction illusion, and a step in which the control circuit restricts an operation of the actuator, based on the operating temperature detected by the temperature sensor.

Effects of the Invention

According to embodiments of the present invention, the operation of an actuator can be restricted so as to prevent the operating temperature of the actuator from increasing, and heat generation of the actuator can be suppressed. Accordingly, even when the heat generated by the actuator is transferred to the skin of a user hand holding a housing, the temperature can be suppressed to a level lower than a temperature at which a low temperature burn possibly occurs. The risk of causing a user to suffer a low temperature burn can be avoided in advance. As a result, it is possible to realize an extremely safe electronic device having no risk of causing a low temperature burn even if an actuator is installed to exert a traction illusion generation function.

DETAILED DESCRIPTION OF ILLUSTRATIVE EMBODIMENTS

Next, embodiments of the present invention will be described with reference to drawings.

First Embodiment

Figure 1:
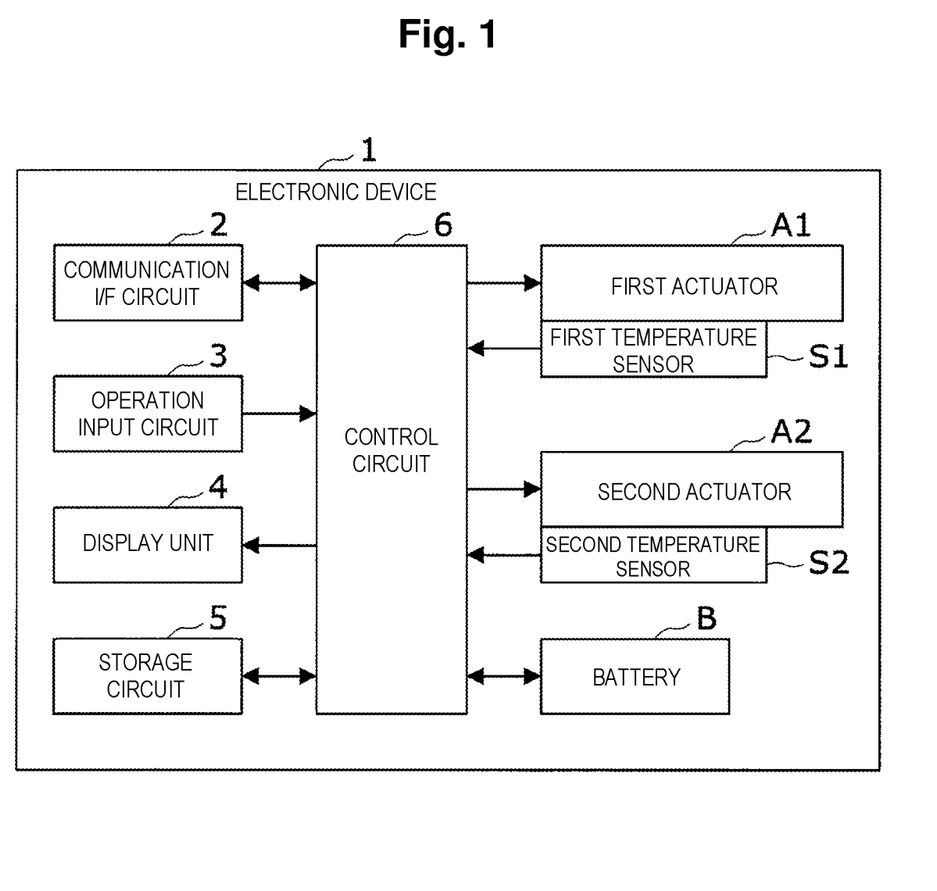
FIG. 1 is a block diagram illustrating circuit components of an electronic device.
Figure 2:
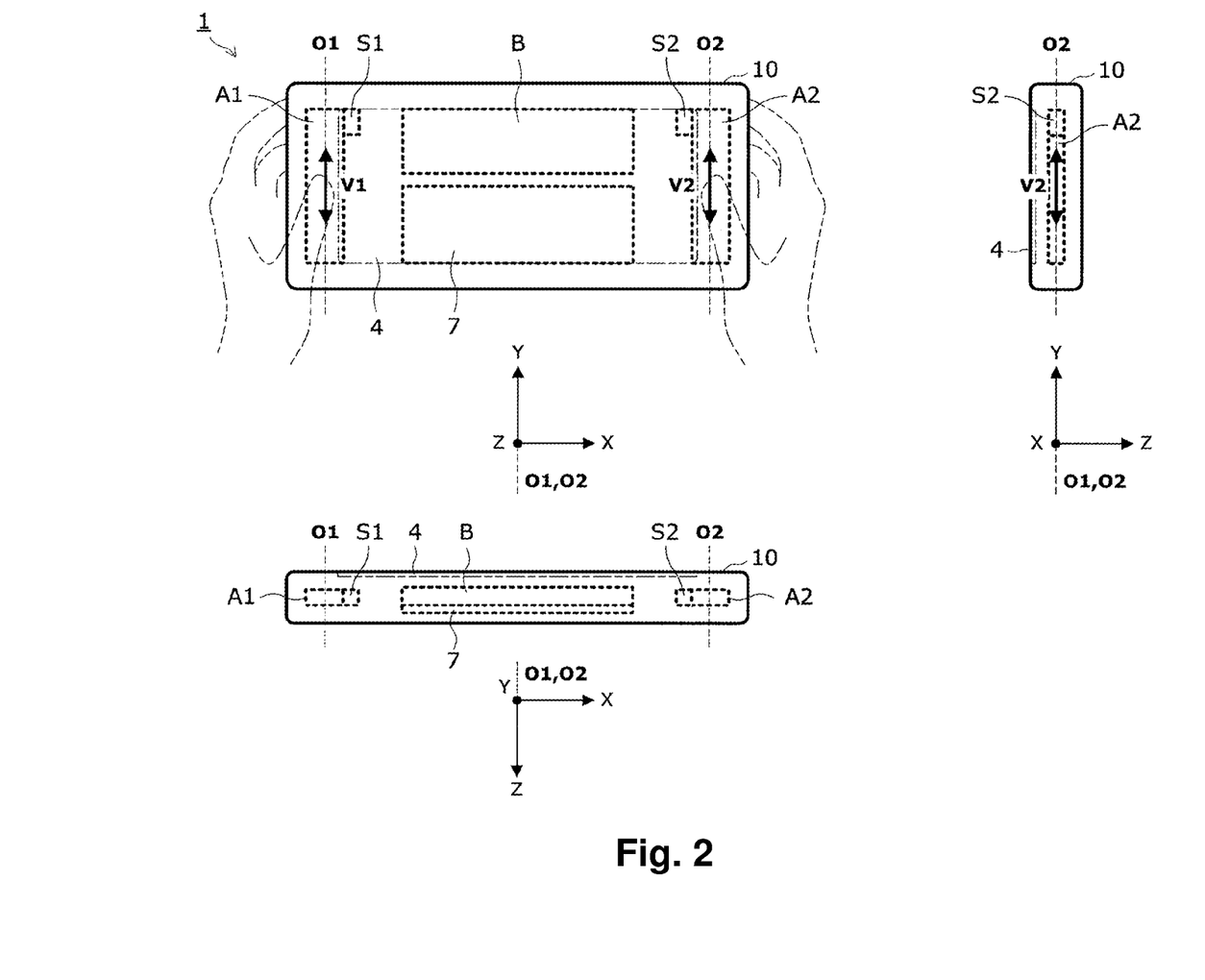
FIG. 2 is a trihedral drawing illustrating a configuration of the electronic device.

First, an electronic device 1 according to a first embodiment of the present invention will be described with reference to FIG. 1 and FIG. 2. FIG. 1 is a block diagram illustrating circuit components of the electronic device. FIG. 2 is a trihedral drawing illustrating a configuration of the electronic device.

The electronic device 1 according to embodiments of the present invention has a compact and portable housing 10, such as a smartphone, a tablet, or a portable game machine, for example. In the following description, for the purpose of simplifying the description, it is assumed that the housing 10 has a substantially rectangular-parallelepiped shape forming a flat plate. Further, a direction along the longer (horizontal) direction of the housing 10 is referred to as direction X, a direction along the shorter (vertical) direction of the housing 10 is referred to as direction Y, and a direction along the thickness direction of the housing 10 is referred to as direction Z. These directions X, Y, and Z are orthogonal to each other.

As illustrated in FIG. 1, the electronic device 1 includes, as main circuit components, a communication interface (I/F) circuit 2, an operation input circuit 3, a display unit 4, a storage circuit 5, a control circuit 6, a battery B, an actuator (first actuator) A1, an actuator (second actuator) A2, a temperature sensor (first temperature sensor) S1, and a temperature sensor (second temperature sensor) S2. These circuit units are installed inside the housing 10.

Of these circuit components, the communication I/F circuit 2, the operation input circuit 3, the storage circuit 5, and the control circuit 6 are mounted on a single control substrate 7 and installed inside the housing 10, as illustrated in FIG. 2. The display unit 4, the battery B, the actuators A1 and A2, and the temperature sensors S1 and S2 are electrically connected to the control substrate 7 via wiring.

The communication I/F circuit 2 is a circuit unit that performs data communication with an external device (not illustrated) via a wireless line or a wired line.

The operation input circuit 3 includes an operation input device, such as touch keys, operation buttons, and operation switches, and serves as a circuit unit that detects user operations and outputs them to the control circuit 6.

The display unit 4 includes a display device, such as a liquid crystal display (LCD) or a light emitting diode (LED) display, and serves as a circuit unit that visually displays display contents output from the control circuit 6. In the following description, for easy understanding, the display unit 4 is illustrated in each drawing. However, the configuration is not limited to the illustrated examples, and the display unit 4 may not be provided.

The storage circuit 5 includes a storage device, such as a semiconductor memory, and serves as a circuit unit that stores processing data and programs to be used by the control circuit 6 when executing various kinds of processing. The battery B is a battery configured to supply driving voltage for driving, at least, the actuators A1 and A2. The battery B may be a primary battery or a secondary battery. The battery B may be configured to supply operating voltage for causing each of the communication I/F circuit 2, the operation input circuit 3, the display unit 4, the storage circuit 5, the battery B, the control circuit 6, and the temperature sensors S1 and S2, in addition to the driving voltage.

The control circuit 6 has a central processing unit (CPU) and a peripheral circuit thereof, and is functionally operable by causing the CPU to cooperate with a program of the storage circuit 5 to execute various kinds of processing including various applications and traction illusion generation control processing as well as operating temperature control processing for suppressing the increase in operating temperature of the actuators A1 and A2. In embodiments of the present invention, the above-mentioned operating temperature control processing is performed in such a way as to restrict operations of the actuators A1 and A2 based on operating temperature Td detected by the temperature sensors S1 and S2. The operating temperature control processing will be described in detail below.

The actuator A1 is a circuit unit that generates vibration V1 along a first axis O1 in response to an applied driving voltage.

The actuator A2 is a circuit unit that generates vibration V2 along a second axis O2 in response to an applied driving voltage.

Actually usable examples of these actuators A1 and A2 include a vibrator having a known configuration, for example, as disclosed in the above-described Patent Literature 1.

The temperature sensor S1 is attached to the actuator A1 and is a temperature sensor that detects, as an operating temperature, the temperature of the actuator A1 variable according to the driving of the control circuit 6.

Temperature sensor S2 is attached to the actuator A2 and is a temperature sensor that detects, as an operating temperature, the temperature of the actuator A2 variable according to the driving of the control circuit 6.

General temperature sensors, such as resistance thermometer bulbs, linear resistors, thermocouples, and thermistors, are usable as these temperature sensors S1 and S2.

The temperature of the battery B fluctuates depending on the amount of driving voltage supplied to the actuators A1 and A2, and changes in the same manner as the temperature of the actuators A1 and A2. Therefore, it may be useful to detect the temperature of the battery B, as an operating temperature, instead of the temperature of the actuators A1 and A2. As a result, not only the number of temperature sensors can be reduced to one, but also the possibility of causing a user to suffer a low temperature burn due to heat generation by the battery B can be avoided.

Alternatively, it may be useful to detect the temperature of a portion of the housing 10 held by a user, as an operating temperature. As a result, heat generation of the actuators A1 and A2 can be suppressed based on the temperature of a portion that is actually in contact with the skin of a user hand, and the operating temperature control can be realized more accurately.

As illustrated in FIG. 2, the actuators A1 and A2 are arranged on the right and left sides in the housing 10. As a result, in a state where a user holds the right and left sides of the housing 10 with both hands while keeping both arms in front, the actuators A1 and A2 generate the vibrations V1 and V2 along the direction Y so that a traction illusion is generated in a direction along the direction Y. Accordingly, in a game or an application executed by the electronic device 1, various stimuli using not only the visual sense but also the tactile sense can be given to a user.

Operation of First Embodiment

Figure 3:
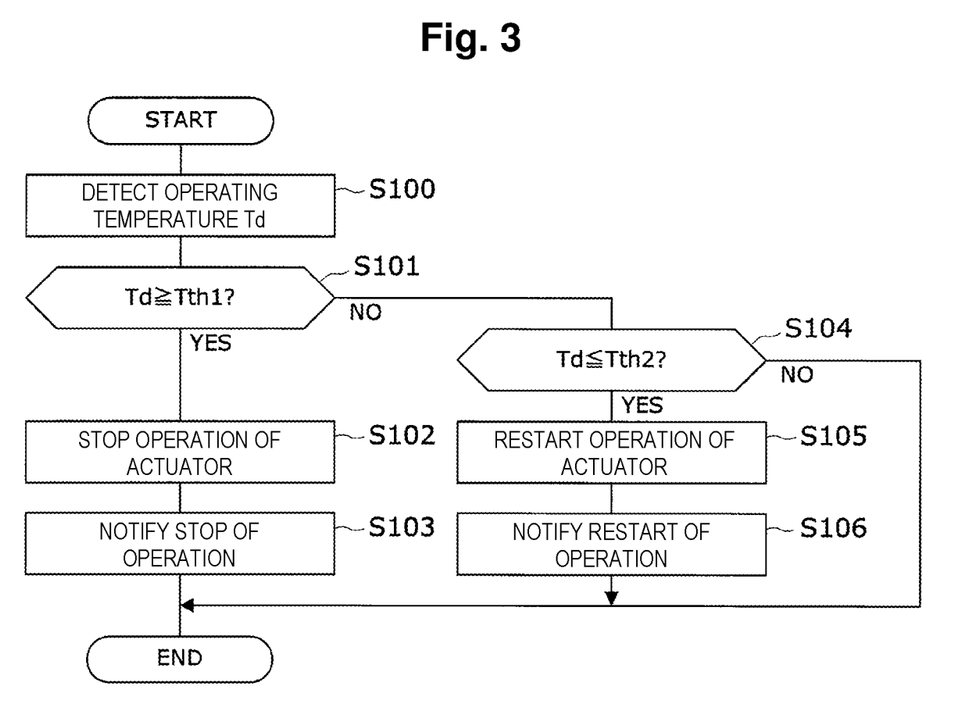
FIG. 3 is a flowchart illustrating operating temperature control processing according to a first embodiment.

Next, operating temperature control processing performed by the electronic device 1 according to the present embodiment will be described with reference to FIG. 3. FIG. 3 is a flowchart illustrating the operating temperature control processing according to the first embodiment.

The control circuit 6 executes the operating temperature control processing of FIG. 3 related to the actuators A1 and A2 in parallel according to the arrival of preset control timing. Hereinafter, in order to facilitate understanding, an exemplary case in which the operating temperature control processing related to the actuator A1 is performed will be described. A threshold (first threshold) Tth1 and a threshold (second threshold) Tth2 may be empirically set according to operating characteristics of the actuators A1 and A2 and the configuration of the housing 10.

First, the control circuit 6 detects the operating temperature Td of the actuator A1 from the temperature sensor S1 (step S100), and compares the operating temperature Td with the preset threshold Tth1 (step S101).

When the operating temperature Td is equal to or higher than the threshold Tth1 (YES in step S101), the control circuit 6 determines that the operation is infeasible and stops the control for operating the actuator A1 (step S102), notifies the user that the control for operating the actuator A1 is stopped due to the temperature rise (step S103), and terminates the sequential operating temperature control processing.

On the other hand, in step S101, if the operating temperature Td is less than the threshold Tth1 (NO in step S101), the control circuit 6 compares the operating temperature Td with the preset threshold Tth2 (Tth1>Tth2) (step S104).

When operating temperature Td is equal to or higher than the threshold Tth2 (NO in step S104), the control circuit 6 terminates the sequential operating temperature control processing.

Further, in step S104, if the operating temperature Td is equal to or lower than the threshold Tth2 (YES in step S104), the control circuit 6 determines that the operation is feasible and restarts the control for operating the actuator A1 (step S105), notifies the user that the control for operating the actuator A1 is restarted because of the temperature drop (step S106), and terminates the sequential operating temperature control processing.

Figure 4:
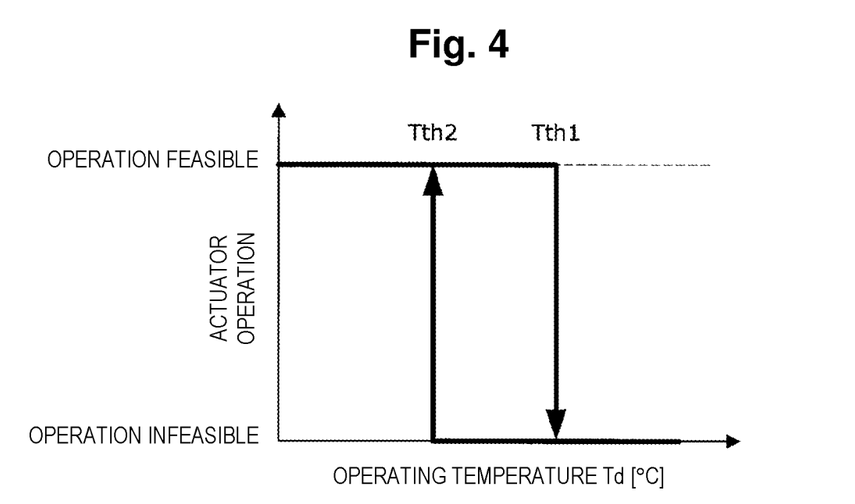
FIG. 4 is an explanatory diagram illustrating actuator operability determination of FIG. 3.

FIG. 4 is an explanatory diagram illustrating the actuator operability determination of FIG. 3. As described with reference to FIG. 3, when the threshold Tth1 and the threshold Tth2 lower than Tth1 are used, the operability determination has hysteresis characteristics illustrated in FIG. 4.

That is, in the state where the operation is feasible, it is determined that the operation is infeasible only when the operating temperature Td is equal to or higher than Tth1. Further, in the state where the operation is infeasible, it is determined that the operation is feasible only when Td is equal to or less than Tth2. As a result, once the operating temperature rises, the operating temperature can be surely lowered.

Figure 5:
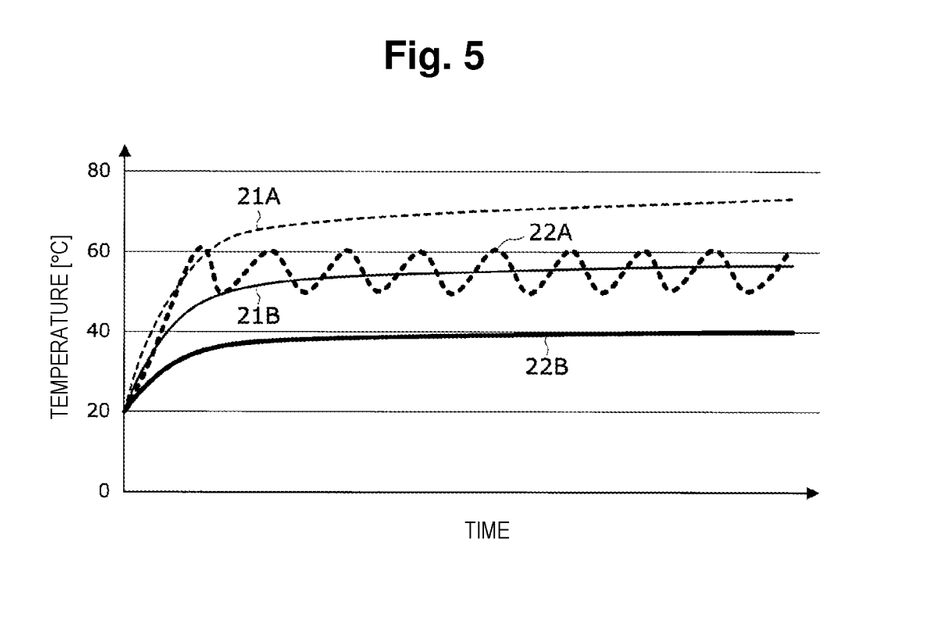
FIG. 5 is a graph illustrating exemplary operating temperature control processing.

FIG. 5 is a graph illustrating exemplary operating temperature control processing. In FIG. 5, characteristic 21A and characteristic 21B indicate temporal transitions of the temperature of the actuator A1 and the temperature of the holding portion of the housing 10 in a case where the operating temperature control processing of FIG. 3 is not applied. Further, characteristic 22A and characteristic 22B indicate temporal transitions of the temperature of the actuator A1 and the temperature of the holding portion of the housing 10 in a case where the operating temperature control processing of FIG. 3 is applied. It is assumed that the temperature of the actuator A1 at the start of the operation control is 20° C.

It is understood that, in the case where the operating temperature control processing of FIG. 3 is not applied, the temperature of the actuator A1 indicated by the characteristic 21A exceeds 70° C. and the temperature of the holding portion of the housing 10 indicated by the characteristic 21B exceeds 50° C. In such a case, since the temperature of the holding portion of the housing 10 is equal to or higher than 45° C., there is a risk of causing a user to suffer a low temperature burn.

On the other hand, it is understood that, in the case where the operating temperature control processing of FIG. 3 is applied, the temperature of the actuator A1 indicated by the characteristic 22A is suppressed to 60° C. or less and the temperature of the holding portion of the housing 10 indicated by the characteristic 22B is suppressed to 40° C. or less. Therefore, the user suffers no low temperature burn.

Figure 6:
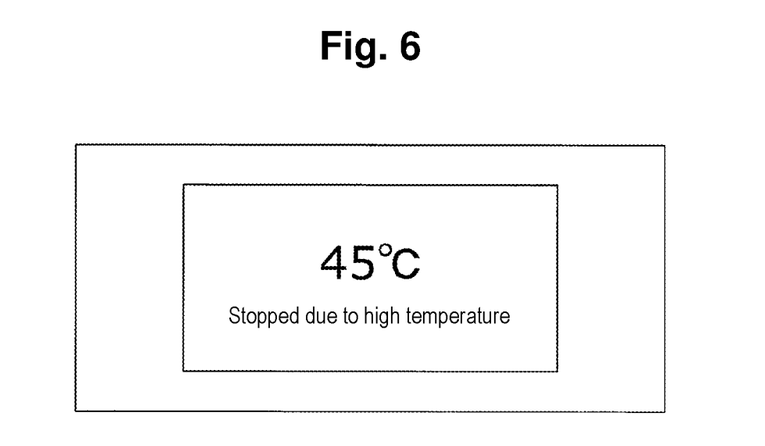
FIG. 6 is an explanatory diagram illustrating an example of notification to a user.

As one of examples of notifying the user of stopping and restarting the operation control, there is a visible display using the display unit 4. FIG. 6 is an explanatory diagram illustrating an example of notification to the user. FIG. 6 illustrates an example of notifying the stop of the operation control, in which "45° C." indicating the operating temperature detected by the temperature sensor S1 and a message "Stopped due to high temperature" are visually displayed on the display unit 4 using characters.

Regarding the notification to the user, as a method other than the visible display, a speaker or a buzzer provided in the control circuit 6 may be used to issue a voice message or a warning sound to realize audible display. Further, the actuators A1 and A2 may be used to realize vibration display.

Effect of First Embodiment

As described above, the present embodiment includes the temperature sensors S1 and S2 configured to detect the operating temperature caused by the actuators A1 and A2, and the control circuit 6 is configured to restrict the operations of the actuators A1 and A2 based on the operating temperature Td detected by the temperature sensors S1 and S2. As a result, the operations of the actuators A1 and A2 can be restricted so as to prevent the operating temperature Td from increasing, and heat generation of the actuators A1 and A2 can be suppressed. Accordingly, even when the heat generated by the actuators A1 and A2 is transferred to the skin of a user hand holding the housing 10, the temperature can be suppressed to a level lower than 45° C. at which a low temperature burn possibly occurs. The risk of causing a user to suffer a low temperature burn can be avoided in advance. As a result, it is possible to realize an extremely safe electronic device having no risk of causing a low temperature burn even if the actuators A1 and A2 is installed to exert a traction illusion generation function.

Further, in the present embodiment, when the operating temperature Td increases to the threshold Tth1 or higher, the control circuit 6 may stop the operations of the actuators A1 and A2. When the operating temperature Td drops below the threshold Tth2 lower than Tth1, the control circuit 6 may restart the operations of the actuators A1 and A2. With this configuration, it is possible to give hysteresis characteristics to the operability determination. In the state where the operation is feasible, it is determined that the operation is infeasible only when the operating temperature Td is equal to or higher than Tth1. Further, in the state where the operation is infeasible, it is determined that the operation is feasible only when Td is equal to or less than Tth2. Accordingly, once the operating temperature rises, the operating temperature can be surely lowered.

Further, in the present embodiment, the battery B for supplying power supply voltage to generate the driving voltage may be provided, and the temperature sensors S1 and S2 may be configured to detect the temperature of the battery B as the operating temperature. With this configuration, not only the number of temperature sensors can be reduced to one, but also the possibility of causing a user to suffer a low temperature burn due to heat generation by the battery B can be avoided.

Further, in the present embodiment, the temperature sensors S1 and S2 may be configured to detect the temperature of the portion of the housing 10 held by a user, as the operating temperature. With this configuration, heat generation of the actuators A1 and A2 can be suppressed based on the temperature of a portion that is actually in contact with the skin of a user hand, and the operating temperature control can be realized more accurately.

Further, in the present embodiment, the control circuit 6 may be configured to perform visible display, audible display, or vibration display of the operating temperature detected by the temperature sensors S1 and S2. Specifically, the display unit 4 may display the operating temperature using characters. Further, the speaker or the buzzer provided in the control circuit 6 may be used to issue a voice message or a warning sound to realize audible display. Further, the actuators A1 and A2 may be used to realize vibration display. Further, a liquid crystal temperature sheet that visually displays the operating temperature may be attached to an outer surface of the housing 10, and it may be configured to notify a user of temperature rise by discoloration of the liquid crystal temperature sheet.

With the above configuration, it is possible to notify a user of a concrete value of the operating temperature. Accordingly, this can avoid a misunderstanding such that a user perceives that stopping the operations of the actuators A1 and A2 due to the temperature rise, as a safety measure, is a failure.

Further, in the present embodiment, the control circuit 6 may be configured to perform visible display, audible display, or vibration display of the increase in operating temperature when the operating temperature increases to a preset threshold (third threshold) Tth3. With this configuration, it is possible to notify a user of a certain degree of increase in operating temperature. Further, setting Tth3 to a value lower than Tth1 at which the operations of the actuators A1 and A2 are stopped enables notifying the possibility of operation stop in advance, and enables urging the user to interrupt the use of the electronic device 1 and related applications.

Second Embodiment

Next, an electronic device 1 according to a second embodiment of the present invention will be described. In the first embodiment, the case where the operations of the actuators A1 and A2 are ON/OFF controlled based on the operating temperature detected by the temperature sensors S1 and S2 has been described. In the present embodiment, a case where driving voltages of the actuators A1 and A2 are switching controlled based on the operating temperature will be described.

That is, in the present embodiment, the storage circuit 5 has a function of storing a correspondence relationship between operating temperature and driving voltage information.

Further, when a new operating temperature is detected by the temperature sensors S1 and S2, the control circuit 6 has a function of acquiring new driving voltage information corresponding to the new operating temperature from the storage circuit 5 and driving the actuators A1 and A2 with driving voltages corresponding to the new driving voltage information.

Figure 7:
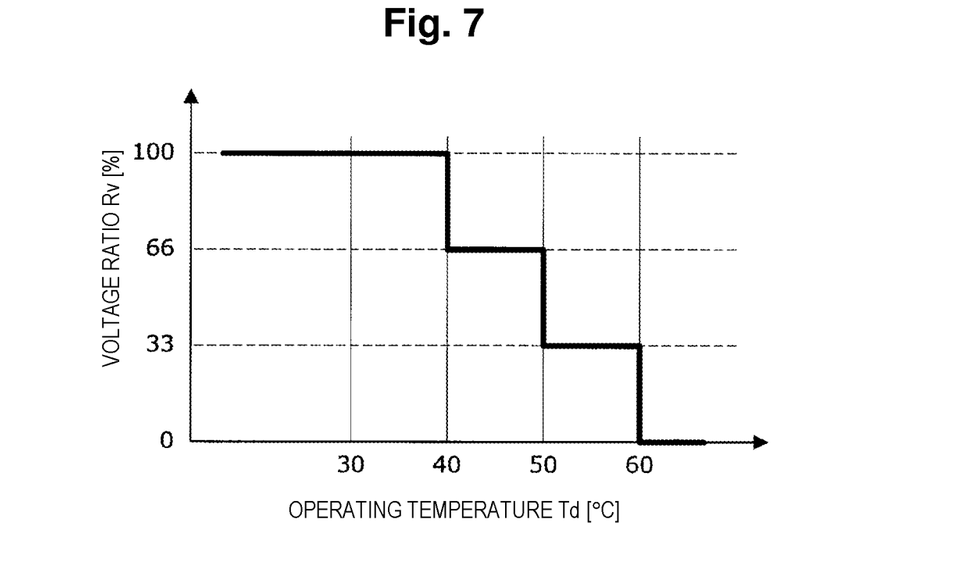
FIG. 7 is a graph illustrating a correspondence relationship between operating temperature and driving voltage information.

FIG. 7 is a graph illustrating the correspondence relationship between operating temperature and driving voltage information. In the correspondence relationship of FIG. 7, voltage ratio Rv [%] is used as driving voltage information corresponding to each operating temperature. The voltage ratio Rv indicates a ratio of driving voltage Vd to be actually applied to the actuators A1 and A2 to the maximum driving voltage prepared in advance.

In the example of FIG. 7, Rv is 100% when Td is in a range lower than 40° C., Rv is 66% in a range higher than 40° C. and lower than 50° C., Rv is 33% in a range higher than 50° C. and lower than 60° C., and Rv is 0% in a range higher than 60° C.

Operation of Second Embodiment

Figure 8:
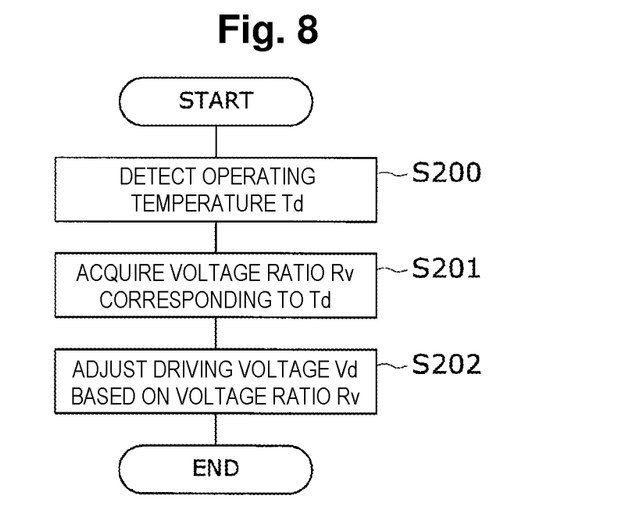
FIG. 8 is a flowchart illustrating operating temperature control processing according to a second embodiment.

Next, operating temperature control processing performed by the electronic device 1 according to the present embodiment will be described with reference to FIG. 8. FIG. 8 is a flowchart illustrating the operating temperature control processing according to the second embodiment.

The control circuit 6 executes the operating temperature control processing of FIG. 8 related to the actuators A1 and A2 in parallel according to the arrival of preset control timing. Hereinafter, in order to facilitate understanding, an exemplary case in which the operating temperature control processing related to the actuator A1 is performed will be described. It is assumed that the correspondence relationship of FIG. 7 is set in advance in the storage circuit 5.

First, the control circuit 6 detects the operating temperature Td of the actuator A1 from the temperature sensor S1 (step S200), and acquires a voltage ratio Rv corresponding to the operating temperature Td with reference to the correspondence relationship stored in the storage circuit 5 (step S201). Subsequently, the control circuit 6 adjusts the driving voltage Vd based on the acquired voltage ratio Rv (step S202), and terminates sequential operating temperature control processing. As a result, when driving the actuators A1 and A2, the control circuit 6 drives the actuators A1 and A2 with the adjusted driving voltage Vd.

Accordingly, for example, in the case of Td=30° C., since Rv is 100%, the driving voltage Vd equal to the maximum driving voltage is used. Further, in the case of Td=45° C., since Rv is 66%, the driving voltage Vd being ⅔ of the maximum driving voltage is used. Further, in the case of Td=55° C., since Rv is 33%, the driving voltage Vd being ⅓ of the maximum driving voltage is used. Further, in the case of Td=65° C., since Rv is 0%, the driving is stopped.

Effect of Second Embodiment

As described above, in the present embodiment, the storage circuit 5 is configured to store the correspondence relationship between operating temperature and driving voltage information. Further, in the present embodiment, the control circuit 6 is configured to acquire, in response to detection of the new operating temperature by the temperature sensors S1 and S2, new driving voltage information corresponding to the new operating temperature from the storage circuit 5, and is configured to drive the actuators A1 and A2 with a driving voltage corresponding to the new driving voltage information.

In general, the amount of heat generated by the actuator increases as the vibration strength increases. The vibration strength changes depending on the magnitude of the driving voltage. Accordingly, reducing the driving voltage Vd with increasing the operating temperature Td can suppress the amount of heat generated by the actuators A1 and A2, and can suppress the operating temperature Td from increasing so that a user suffers no low temperature burn. Therefore, compared to the case of ON/OFF controlling the operations of the actuators A1 and A2, it is possible to cause the actuators A1 and A2 to operate for a long time so as to generate a traction illusion.

Third Embodiment

Next, an electronic device 1 according to a third embodiment of the present invention will be described. As described with reference to FIG. 5, when driving the actuators A1 and A2 for a long time, there is a tendency that the operating temperature Td, such as the temperatures of the actuators A1 and A2 or the temperature of the holding portion of the housing 10, converges to an arbitrary saturation temperature Ts. The saturation temperature Ts changes, as described above, depending on the driving voltage Vd of the actuators A1 and A2.

Figure 9:
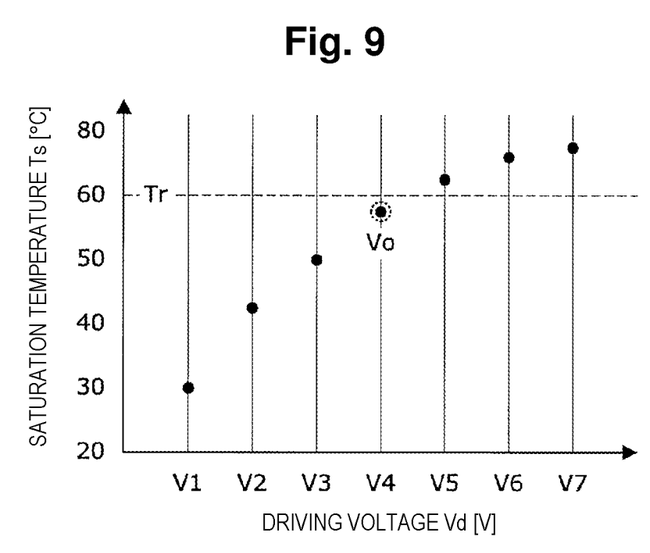
FIG. 9 is a graph illustrating a relationship between driving voltage and saturation temperature.

FIG. 9 is a graph illustrating a relationship between driving voltage and saturation temperature. The example of FIG. 9 includes seven driving voltages Vd, namely V1, V2, . . . , V7, which are set in advance as candidates of the driving voltage Vd, and also includes a plotting of corresponding values of the saturation temperature Ts. In general, there is a tendency that the saturation temperature Ts increases as the driving voltage Vd increases. Accordingly, there is an optimum driving voltage Vo at which the saturation temperature Ts converges to a level that does not cause a user to suffer a low temperature burn.

On the other hand, the higher the driving voltage Vd, the stronger the vibration strength of the actuators A1 and A2. Accordingly, the traction illusion to be generated becomes larger and clearly felt by a user.

The present embodiment is characterized in that a reference temperature Tr at which a user suffers no low temperature burn is set in advance, the saturation temperature Ts is equal to or lower than Tr, and the highest driving voltage Vd is specified as the optimum driving voltage Vo in advance in the control circuit 6.

That is, in the present embodiment, the control circuit 6 has a function of driving the actuators A1 and A2 for a predetermined time with the driving voltage Vd and then detecting the saturation temperature Ts by the temperature sensors S1 and S2, for each of the driving voltages Vd being set in advance, and specifying the highest driving voltage at which the saturation temperature is equal to or lower than the preset reference temperature Tr, among the driving voltages Vd, as the optimum driving voltage Vo.

Operation in Third Embodiment

Figure 10:
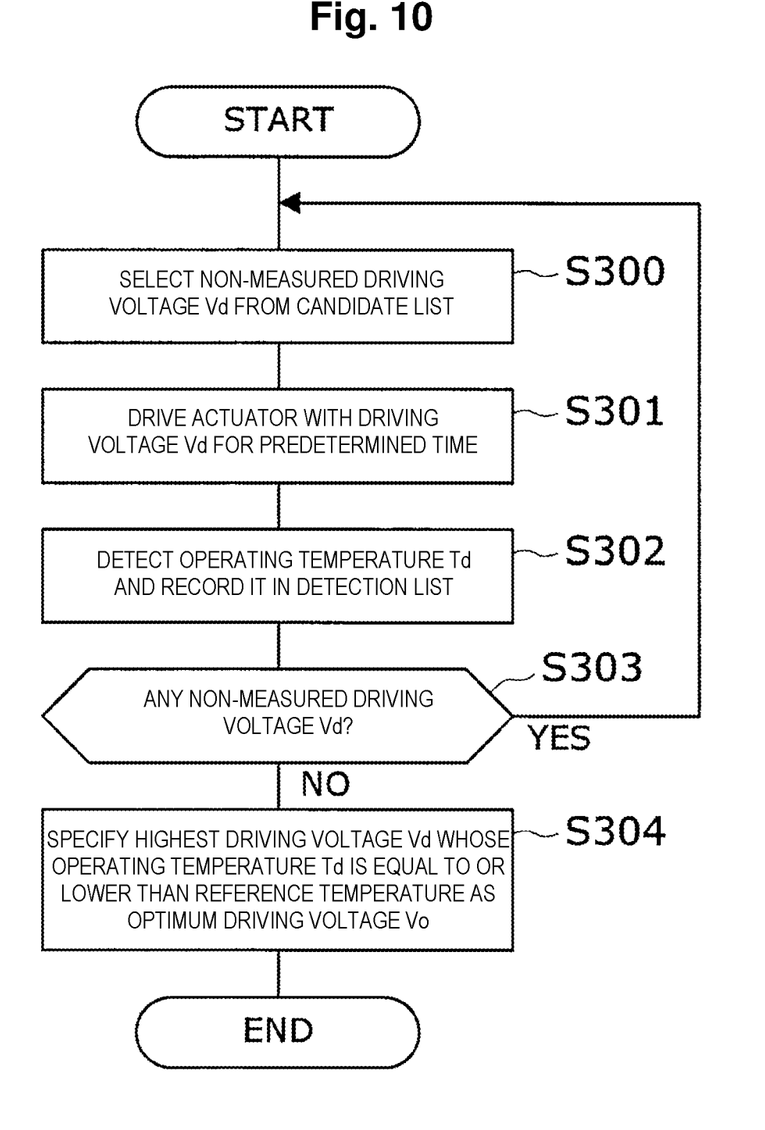
FIG. 10 is a flowchart illustrating optimum driving voltage specifying processing according to a third embodiment.

Next, the optimum driving voltage specifying processing performed by the electronic device 1 according to the present embodiment will be described with reference to FIG. 10. FIG. 10 is a flowchart illustrating the optimum driving voltage specifying processing according to the third embodiment.

The control circuit 6 executes the optimum driving voltage specifying processing of FIG. 10 at the time of initial setting of the electronic device 1, or in response to an instruction operation by an operator. It is assumed that the storage circuit 5 stores a list of multiple candidates of the driving voltage Vd set in advance.

First, the control circuit 6 selects one non-measured driving voltage Vd from the candidate list in the storage circuit 5 (step S300), and drives the actuators A1 and A2 with the selected driving voltage Vd for a predetermined time (step S301).

Subsequently, the control circuit 6 records the operating temperature detected by the temperature sensors S1 and S2 as the saturation temperature Ts in the detection list in the storage circuit 5, while associating it with the driving voltage Vd (step S302), and confirms whether there is any non-measured driving voltage Vd remaining in the candidate list (step S303).

Here, if a non-measured driving voltage Vd remains in the candidate list (YES in step S303), the processing returns to step S300.

On the other hand, if no non-measured driving voltage Vd remains in the candidate list (NO in step S303), the control circuit 6 specifies the highest driving voltage Vd whose operating temperature Td is equal to or lower than the reference temperature Tr, of the voltages in the detection list, as the optimum driving voltage Vo (step S304), and terminates the sequential optimum driving voltage specifying processing.

As a result, the control circuit 6 uses the optimum driving voltage Vo when driving the actuators A1 and A2 subsequently. Therefore, even when the actuators A1 and A2 are driven for a predetermined period, the operating temperature Td is controlled to be equal to or lower than the reference temperature Tr at which a user suffers no low temperature burn.

Effect of Third Embodiment

As described above, in the present embodiment, the control circuit 6 drives the actuators A1 and A2 for a predetermined time with the driving voltage Vd and then detects the saturation temperature Ts by the temperature sensors S1 and S2, for each of the driving voltages Vd being set in advance, and specifies the highest driving voltage at which the saturation temperature is equal to or lower than the preset reference temperature Tr, among the driving voltages Vd, as the optimum driving voltage Vo.

As a result, driving the actuators A1 and A2 with the optimum driving voltage Vo can control the operating temperature Td to be equal to or lower than the reference temperature Tr at which a user suffers no low temperature burn, even when the actuators A1 and A2 are driven for a predetermined period. Accordingly, the risk of causing a user to suffer a low temperature burn can be avoided in advance, and it is possible to cause the actuators A1 and A2 to operate for a long time so as to generate a traction illusion.

Further, even when the actuators A1 and A2, the housing 10, and the like are differentiated in configuration for each type of the electronic device 1, and further the correspondence relationship between the driving voltage Vd and the operating temperature Td (saturation temperature Ts) is also differentiated, the optimum driving voltage Vo that matches the electronic device 1 can be easily specified.

Extension of Embodiment

Although the present invention has been described with reference to some embodiments, the present invention is not limited to the above-described embodiments. The configurations and details of embodiments of the present invention can be modified in various ways that can be understood by those skilled in the art within the scope of the present invention. Further, each embodiment may be arbitrarily combined with another embodiment, when implemented, within a consistent range.

REFERENCE SIGNS LIST 1 electronic device
2 communication I/F circuit
3 operation input circuit
4 display unit
5 storage circuit
6 control circuit
B battery
A1 actuator (first actuator)
A2 actuator (second actuator)
S1 temperature sensor (first temperature sensor)
S2 temperature sensor (second temperature sensor)
Td operating temperature
Tth1 threshold (first threshold)
Tth2 threshold (second threshold)
Rv voltage ratio
Ts saturation temperature
Vo optimum driving voltage

The invention claimed is:

1. An electronic device comprising:
a housing;
an actuator installed inside the housing and configured to generate vibration in response to an application of a driving voltage;
a temperature sensor configured to detect an operating temperature caused by the actuator; and
a control circuit configured to:
apply the driving voltage to the actuator to drive the actuator, thereby generating a traction illusion, wherein the traction illusion is an impression of a hand of a user holding the electronic device being pulled in a specific direction even though the hand is not physically pulled; and
restrict an operation of the actuator, based on the operating temperature detected by the temperature sensor.

2. The electronic device according to claim 1, wherein the temperature sensor is attached to the actuator and is configured to detect a temperature of the actuator as the operating temperature.

3. The electronic device according to claim 1, further comprising
a battery configured to supply a power supply voltage for generating the driving voltage,
wherein the temperature sensor is configured to detect a temperature of the battery as the operating temperature.

4. The electronic device according to claim 1, wherein the temperature sensor is configured to detect a temperature of a holding portion of the housing as the operating temperature, wherein the holding portion of the housing is to be held by the user.

5. The electronic device according to claim 1, wherein the control circuit is configured to stop the operation of the actuator in response to the operating temperature increasing to a first threshold or higher.

6. The electronic device according to claim 5, wherein the control circuit is configured to restart the operation of the actuator in response to the operating temperature dropping below a second threshold, the second threshold being lower than the first threshold.

7. The electronic device according to claim 1, further comprising
a storage circuit configured to store a correspondence relationship between operating temperature information and driving voltage information,
wherein, in response to the operating temperature being detected by the temperature sensor, the control circuit is configured to acquire the driving voltage information corresponding to the operating temperature from the storage circuit and to drive the actuator with the driving voltage corresponding to the driving voltage information.

8. The electronic device according to claim 1, wherein the control circuit is configured to drive the actuator for a predetermined time with the driving voltage, to detect a saturation temperature with the temperature sensor, for each of driving voltages being set in advance, to specify a highest driving voltage at which the saturation temperature is equal to or lower than a preset reference temperature, among the driving voltages, as an optimum driving voltage, and to drive the actuator with the optimum driving voltage.

9. The electronic device according to claim 1, wherein the control circuit is configured to notify the user of the operating temperature in a visible, audible, or vibratory way.

10. The electronic device according to claim 1 further comprising
a liquid crystal temperature sheet attached to an outer surface of the housing, wherein the liquid crystal temperature sheet is configured to visually display the operating temperature.

11. The electronic device according to claim 1, wherein the control circuit is configured to notify the user of an increase in the operating temperature in a visible, audible, or vibratory way, in response to the operating temperature increasing to a third threshold or higher.

12. A control method usable for an electronic device including a housing, an actuator installed inside the housing and configured to generate vibration in response to an application of a driving voltage, a temperature sensor configured to detect an operating temperature caused by the actuator, and a control circuit configured to control the actuator, the method comprising:
applying, with the control circuit, the driving voltage to the actuator to drive the actuator, thereby generating a traction illusion, wherein the traction illusion is an impression of a hand of a user holding the electronic device being pulled in a specific direction even though the hand is not physically pulled; and
restricting, with the control circuit, an operation of the actuator, based on the operating temperature detected by the temperature sensor.

13. A method comprising:
applying a driving voltage to an actuator installed inside a housing of an electronic device, the actuator generating vibration in response to application of the driving voltage for generating a traction illusion, wherein the traction illusion is an impression of a hand of a user holding the electronic device being pulled in a specific direction even though the hand is not physically pulled;
detecting an operating temperature of a holding portion of the housing, the operating temperature increasing during generation of the vibration by the actuator; and
reducing the driving voltage applied to the actuator in response to the operating temperature increasing to a first threshold or higher.

14. The method of claim 13, wherein reducing the driving voltage applied to the actuator stops operation of the actuator.

15. The method of claim 13, wherein reducing the driving voltage applied to the actuator reduces operation of the actuator.

\* \* \* \* \*